(12) United States Patent
Torres Platas et al.

(10) Patent No.: US 10,329,808 B2
(45) Date of Patent: Jun. 25, 2019

(54) MAGNETIC ANTI-THEFT LOCK SYSTEM AND METHOD

(71) Applicant: FORD GLOBAL TECHNOLOGIES, LLC, Dearborn, MI (US)

(72) Inventors: Virgilio Torres Platas, Mexico City (MX); Pamela Dueñas Marroquín, Ciudad López Mateos (MX)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 15/423,671

(22) Filed: Feb. 3, 2017

(65) Prior Publication Data

US 2018/0223569 A1 Aug. 9, 2018

(51) Int. Cl.
| | |
|---|---|
| *E05B 81/56* | (2014.01) |
| *B60R 25/00* | (2013.01) |
| *B60R 25/10* | (2013.01) |
| *B60R 1/12* | (2006.01) |
| *E05B 65/00* | (2006.01) |
| *E05B 73/00* | (2006.01) |
| *E05B 77/02* | (2014.01) |
| *E05B 77/54* | (2014.01) |
| *E05B 81/08* | (2014.01) |
| *E05B 81/64* | (2014.01) |
| *E05B 81/80* | (2014.01) |

(52) U.S. Cl.
CPC ............... *E05B 81/56* (2013.01); *B60R 1/12* (2013.01); *B60R 25/00* (2013.01); *B60R 25/1001* (2013.01); *E05B 65/00* (2013.01); *E05B 73/0017* (2013.01); *E05B 77/02* (2013.01); *E05B 77/54* (2013.01); *E05B 81/08* (2013.01); *E05B 81/64* (2013.01); *E05B 81/80* (2013.01)

(58) Field of Classification Search
CPC .......... E05B 81/56; E05B 81/08; E05B 81/64; E05B 81/80; B60R 25/00; B60R 25/1001
USPC ................ 307/9.1, 10.1, 10.2, 10.3; 359/834
See application file for complete search history.

(56) References Cited

U.S. PATENT DOCUMENTS

| | | | |
|---|---|---|---|
| 3,475,081 A | 10/1969 | Russell et al. | |
| 4,281,898 A | 8/1981 | Ochiai et al. | |
| 5,264,962 A | 11/1993 | Kho | |
| 6,486,793 B1 | 11/2002 | Buccola | |
| 2002/0063976 A1* | 5/2002 | Kho | B60R 1/10 359/834 |

(Continued)

FOREIGN PATENT DOCUMENTS

| | | |
|---|---|---|
| CN | 201411988 Y | 2/2010 |
| CN | 202357990 U | 8/2012 |

(Continued)

OTHER PUBLICATIONS

English Machine Translation of CN102923056A.

(Continued)

*Primary Examiner* — Tomi Skibinski
(74) *Attorney, Agent, or Firm* — Jason Rogers; Vichit Chea; King & Schickli, PLLC

(57) ABSTRACT

An anti-theft lock system for a motor vehicle includes a motor vehicle support surface, a component to be protected from theft and an electromagnetic locking feature securing the component to the motor vehicle support surface. An anti-theft mirror and a method of preventing theft of a frangible component from a motor vehicle are also disclosed.

13 Claims, 4 Drawing Sheets

(56) References Cited

U.S. PATENT DOCUMENTS

2015/0278558 A1* 10/2015 Priev ................. G06F 21/86
726/35

FOREIGN PATENT DOCUMENTS

| CN | 202669739 | U  | 1/2013 |
|----|-----------|----|--------|
| CN | 102923056 | A  | 2/2013 |
| CN | 204398995 | U  | 6/2015 |
| CN | 204452211 | U  | 7/2015 |
| DE | 19900988  | A1 | 7/2000 |
| EP | 0112665   | A1 | 7/1984 |

OTHER PUBLICATIONS

English Machine Translation of CN201411988Y.
English Machine Translation of CN202357990U.
English Machine Translation of CN202669739U.
English Machine Translation of CN204398995U.
English Machine Translation of CN204452211U.
English Machine Translation of DE19900988A1.

* cited by examiner

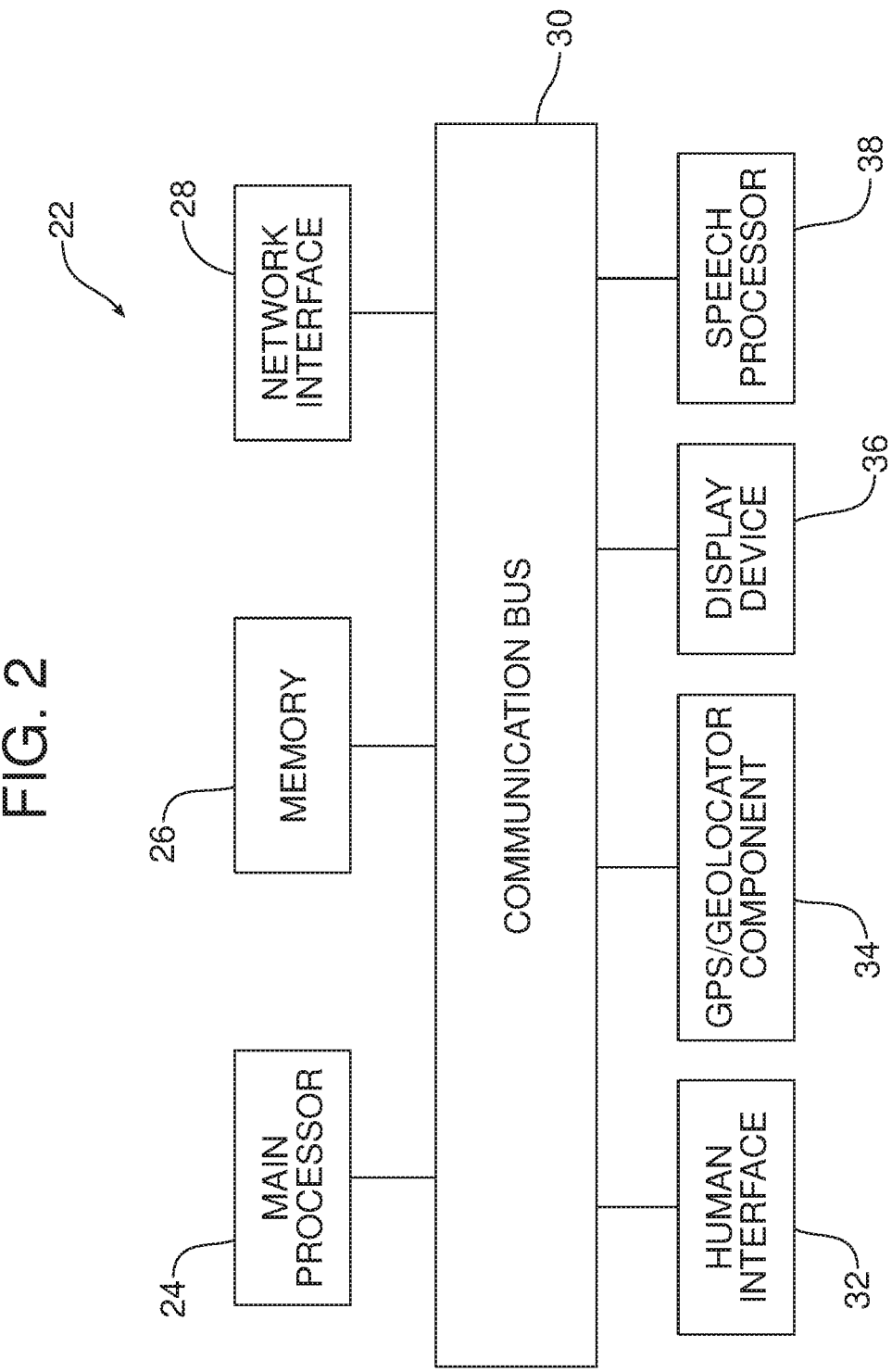

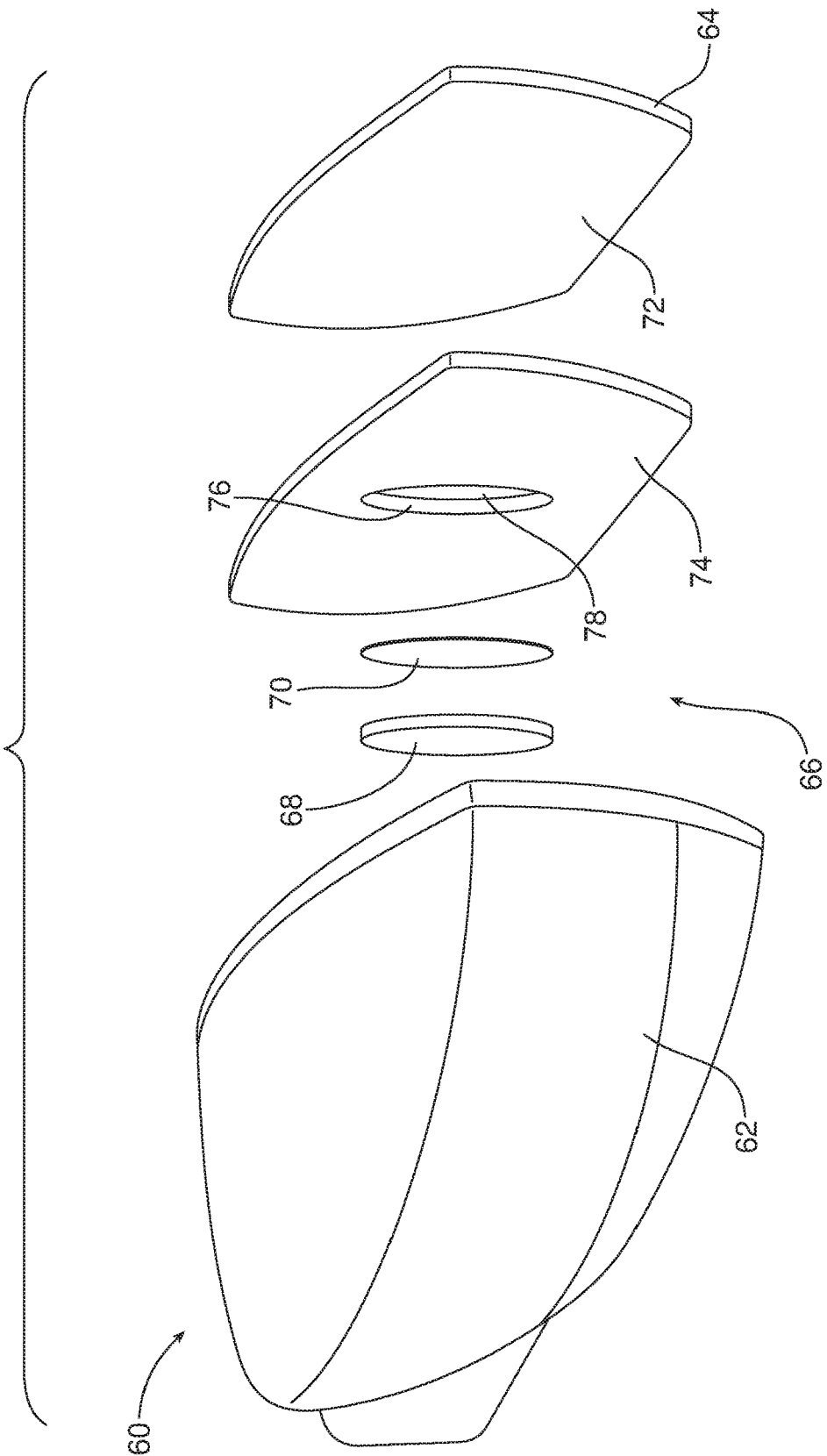

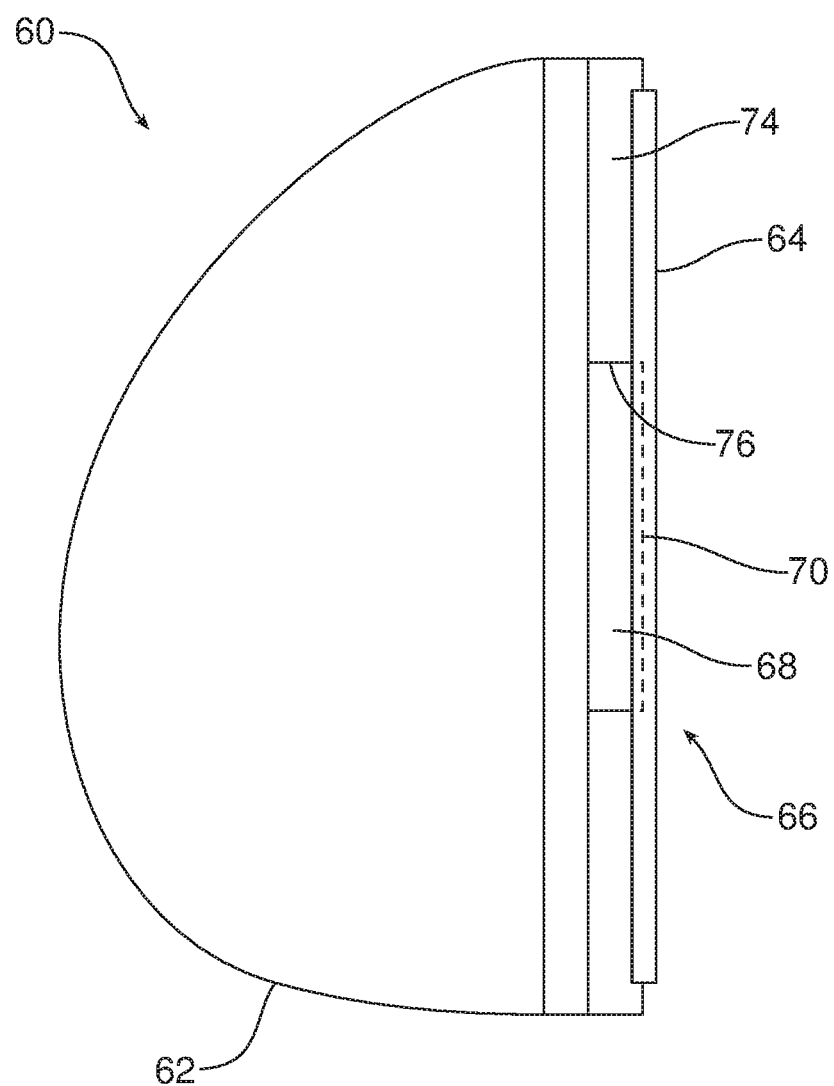

MAGNETIC ANTI-THEFT LOCK SYSTEM AND METHOD

TECHNICAL FIELD

This document relates generally to the motor vehicle equipment field and, more particularly, to a magnetic anti-theft lock system (MALS) and related method for discouraging or preventing theft of a frangible component from a motor vehicle.

BACKGROUND

Vehicle parts theft is an increasing problem in many countries including particularly those where stolen vehicle part black markets exist. It is said that vehicle thieves can make two to four times a vehicle's worth by selling its individual parts. Victims of vehicle parts theft must deal with the annoyance and expense of having the vehicle repaired as well as the psychological burden of a theft.

This document relates to a new and improved anti-theft lock system particularly adapted for protecting frangible motor vehicle components from theft. Many of such components are otherwise easily stolen.

SUMMARY

In accordance with the purposes and benefits described herein, an anti-theft lock system is provided for a motor vehicle. That anti-theft lock system comprises a motor vehicle support surface, a component to be protected from theft and an electromagnetic locking feature that secures the component to the motor vehicle support surface.

The electromagnetic locking feature may include an electromagnet fixed to the motor vehicle support surface and a ferromagnetic target fixed to or integrated into the component. In addition, the electromagnetic locking feature may further include a controller configured to activate the electromagnet in response to an ignition switch of the motor vehicle being switched off. Still further, the controller may be further configured to activate the electromagnet in response to the locking of doors of the motor vehicle while the motor vehicle ignition switch is switched off.

If one tries to steal the component while the electromagnet is activated, the frangible component will break thereby making it worthless to the potential thief. In this way theft of the component is deterred.

In accordance with an additional aspect, an anti-theft mirror is provided. That anti-theft mirror comprises a mirror housing, a mirror body held in the mirror housing and an electromagnetic locking feature securing the mirror body to the mirror housing.

The electromagnetic locking feature may include an electromagnet fixed to the mirror housing and a ferromagnetic target fixed to or integrated into the mirror body. That electromagnetic locking feature may further include a controller configured to activate the electromagnet in response to an ignition switch of the motor vehicle being switched off. Further, the controller may be configured to activate the electromagnet in response to the locking of doors of the motor vehicle while the ignition switch is switched off.

The anti-theft mirror may also include a mirror frame for supporting the mirror body. That mirror frame may include an inner margin defining an aperture. The electromagnet extends into the aperture into contact with the ferromagnetic target on the mirror body.

In accordance with yet another aspect, a method is provided of preventing theft of a frangible component from a motor vehicle. That method may be defined as comprising the step of providing an electromagnetic locking feature to secure the frangible component to a motor vehicle support surface.

The method may further include the step of securing the frangible component with sufficient electromagnetic force to cause the frangible component to break if removed from the motor vehicle support surface while the electromagnetic locking feature is activated.

The method may further include the step of fixing an electromagnet to the motor vehicle support surface. In addition, the method may include the step of fixing a ferromagnetic target to the frangible component.

Still further, the method may include configuring a controller of the electromagnetic locking feature to activate the electromagnet when an ignition switch of the motor vehicle is switched off. Further, the method may include configuring the controller to activate the electromagnet in response to locking of doors of the motor vehicle when the ignition switch is switched off.

Still further, the method may include the step of configuring the controller to deactivate the electromagnet in response to unlocking of the doors of the motor vehicle. The method may also include the step of configuring the controller to deactivate the electromagnet in response to a power source of the motor vehicle falling below a predetermined voltage level. Finally, the method may include the step of selecting the frangible component from a group of components consisting of a mirror body, a tail lamp, a fog lamp, a logo, a hood ornament and a trim panel.

In the following description, there are shown and described several preferred embodiments of the anti-theft lock system, the anti-theft mirror and the method of preventing theft of a frangible component from a motor vehicle. As it should be realized, the system, mirror and method are capable of other, different embodiments and their several details are capable of modification in various, obvious aspects all without departing from the system, mirror and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the anti-theft lock system, the anti-theft mirror and the related method of preventing theft of a frangible component from a motor vehicle and together with the description serve to explain certain principles thereof.

FIG. 2 is a schematic block diagram of one possible embodiment of the controller of that anti-theft lock system illustrated in FIG. 1.

FIG. 3 is an exploded perspective view of the anti-theft mirror.

FIG. 4 is a schematic cross sectional illustration of the assembled anti-theft mirror illustrated in FIG. 3.

Figure 1:
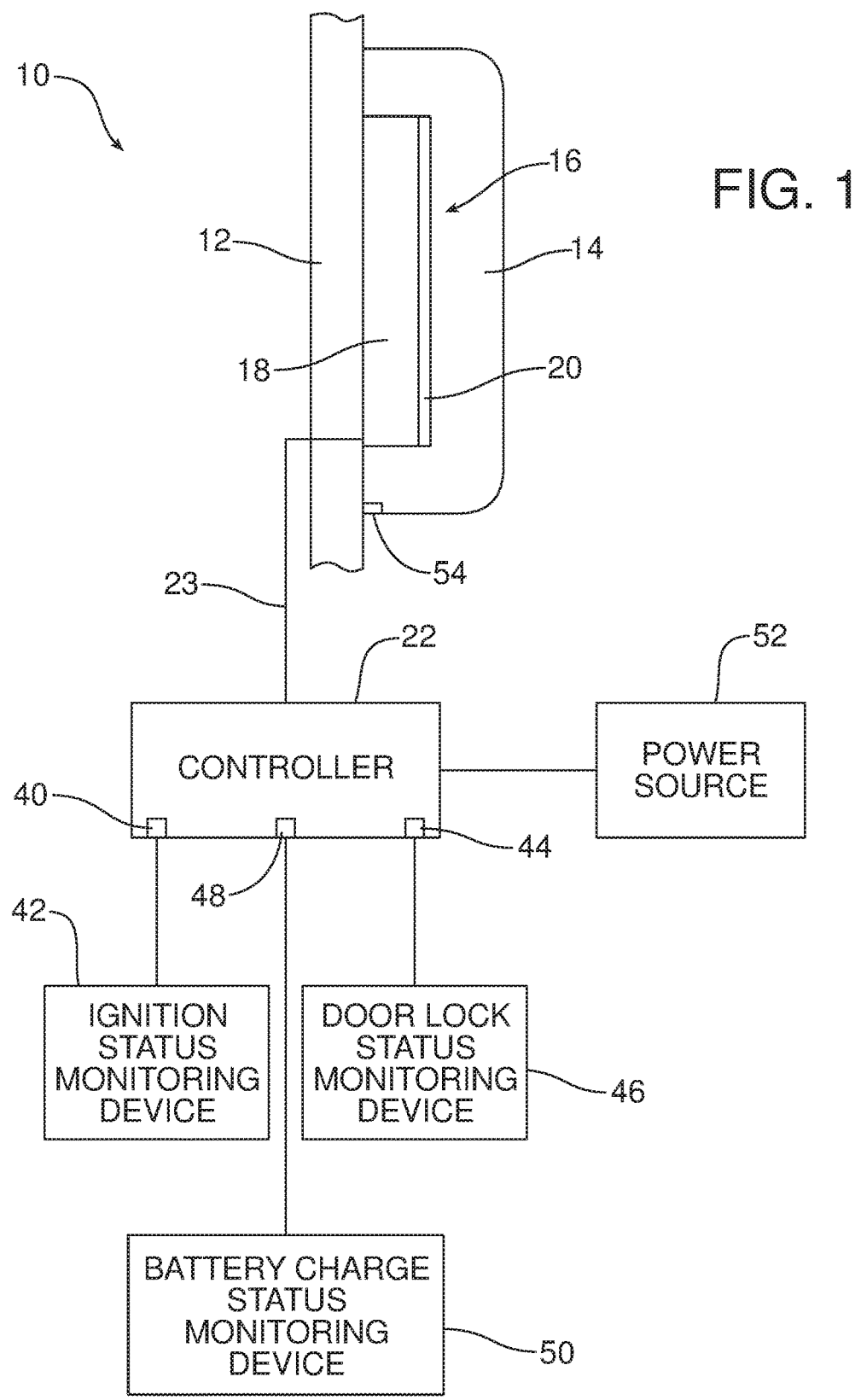
FIG. 1 is a schematic block diagram of the anti-theft lock system.

Reference will now be made in detail to the present preferred embodiments of the anti-theft lock system, anti-theft mirror and related method, examples of which are illustrated in the accompanying drawing figures.

DETAILED DESCRIPTION

Reference is now made to FIG. 1 which schematically illustrates the new and improved anti-theft lock system 10. That anti-theft lock system 10 comprises a motor vehicle support surface 12, a part or component 14 to be protected from theft and an electromagnetic locking feature 16 securing that component to the motor vehicle support surface. The motor vehicle support surface 12 may comprise, but is not necessarily limited to, a body panel, and the chassis or frame of the motor vehicle. The component 14 may comprise, but is not necessarily limited to, a mirror body, a tail lamp, a fog lamp, a logo, a hood ornament and a trim panel.

The electromagnetic locking feature 16 of the illustrated embodiment includes an electromagnet 18 fixed to the motor vehicle support surface 12 and a ferromagnetic target 20 fixed to the component 14. In some embodiments, the ferromagnetic target 20 is integrated into the actual surface or structure of the component 14. In others, the ferromagnet target 20 may be attached to the component by means of a fastener or a permanent adhesive.

As further illustrated in FIG. 1, the electromagnetic locking feature 16 also includes a controller 22 connected to the electromagnet 18 by the lead 23. The controller 22 may comprise a computing device such as a dedicated microprocessor or an electronic control unit (ECU) operating in accordance with instructions from appropriate control software. Thus, as illustrated in FIG. 2, the controller 22 may comprise one or more processors 24, one or more memories 26 and one or more network interfaces 28 all in communication with each other over a communication bus 30.

In some embodiments the controller 22 may comprise a body control module (BCM). A BCM controller 22 may further include a human interface 32, a GPS/geolocator component 34, a display device such as a multi-function display with touchscreen capability 36 and a speech processor 38 for voice command capability. As further illustrated in FIG. 2, the human interface 32, the GPS/geolocator component 34, the display device 36 and the speech processor 38 are also connected for communication through the communication bus 30.

The BCM controller 22 may perform a number of interior body electrically based functions including, for example, interior locking, remote key entry, interior lighting, exterior lighting, windshield wiper control and the like. In some embodiments, the BCM controller 22 may also function to control entertainment functions (e.g. radio, CD player and communications such as telephone and internet communications over a wireless network). In some embodiments, the BCM controller 22 may be connected by a communication bus (not shown) to other control modules that provide one or more of these additional functions.

The controller 22 may be configured to activate the electromagnet 18 in response to an ignition switch of the motor vehicle being switched off. Further, the controller 22 may be configured to activate the electromagnet 18 in response to the locking of the doors of the motor vehicle when the ignition switch of the motor vehicle is switched off. Toward this end, the controller 22 includes a first data input 26 connected to an ignition status monitoring device 28 which provides ignition status data to the controller 22. The ignition status monitoring device 28 may comprise, for example, an ignition status sensor or a power train control module (PCM).

As further illustrated in FIG. 1, the controller 22 includes a second data input 44 connected to a door lock status monitoring device 46 capable of providing data respecting the door lock status of the doors of the motor vehicle. That door lock status monitoring device 46 may comprise a series of sensors, a door lock module of a type known in the art or other appropriate means.

As further illustrated in FIG. 1, the controller 22 also includes a third data input 48 that is connected to a battery charge status monitoring device capable of providing battery charge status data to the controller 22.

When an operator parks the motor vehicle and switches off the ignition, data indicating that the motor vehicle ignition is switched off is provided to the controller 22 by the ignition status monitoring device 42 through the first data input 40. When the operator then exits the motor vehicle and locks the doors of the motor vehicle, the locking of the doors is indicated to the controller 22 by data received at the second data input 44 from the door lock status monitoring device 46.

In response, the controller 22 directs power from the power source 52 to the electromagnet 18 thereby activating the electromagnet and creating a magnetic field coupling the electromagnet that is fixed to the motor vehicle support surface 12 to the corresponding, cooperating ferromagnetic target 20 fixed to the component 14. Significantly, the component 14 is secured with sufficient electromagnetic force to cause the component to break if removed from the motor vehicle support surface by a thief while the electromagnetic locking feature 16 and, more particularly, the electromagnet 18, is activated or energized. Theft is deterred since the component 14 is broken and rendered valueless if stolen. A visual indicator, such as an LED 54 may be illuminated to indicate that the magnetic anti-theft locking system 10 is activated and operative, effectively notifying a potential thief that attempted theft of the component 14 is a useless undertaking.

Reference is now made to FIGS. 3 and 4 which illustrate an anti-theft mirror 60 including a mirror housing 62, a mirror body 64 held in the mirror housing and an electromagnetic feature 66 securing the mirror body to the mirror housing. In the illustrated embodiment, the electromagnetic locking feature 66 includes an electromagnet 68 fixed to the mirror housing 62 and a cooperating ferromagnetic target 70 fixed to the rear face 72 of the mirror body 64. The electromagnet 68 is connected to a controller (not shown) which operates in an identical manner to the controller 22 described above.

As further illustrated in FIGS. 3 and 4, the anti-theft mirror 60 also includes a mirror frame 74 having an inner margin 76 defining an aperture 78. When properly assembled, as illustrated in FIG. 4, the electromagnetic 68, fixed to the mirror housing 62, extends through the aperture 78 in the mirror frame 74 so as to be juxtaposed to and in contact with the ferromagnetic target 70 shown integrated into the mirror body 64 so as to be flush with the rear face 72 thereof. When energized, the electromagnet 68 secures the frangible mirror body 64 with sufficient electromagnetic force to cause the mirror body to break if removed from the mirror housing 62 while the electromagnetic locking feature 66 is activated.

Consistent with the above description, a method is provided of preventing theft of a frangible component 14/mirror body 64 from a motor vehicle. That method may be broadly described as comprising the step of providing an electromagnetic locking feature 16/66 to secure the frangible component 14/mirror body 64 to a motor vehicle support surface 12/mirror housing 62.

The method may also include the step of securing the frangible component 14/mirror body 64 with sufficient electromagnetic force to cause the frangible component/mirror body to break if removed from the motor vehicle support surface/mirror housing while the electromagnetic locking feature 16/66 is activated.

The method may also include the step of fixing an electromagnet 18 to the motor vehicle support surface 12 and fixing a ferromagnetic target 20 to the frangible component 14.

Still further, the method may include configuring the controller 22 to activate the electromagnet 18/68 when an ignition switch of the motor vehicle is switched off. Alternatively, the controller 22 may also be configured to activate the electromagnet 18/68 in response to the locking of the doors of the motor vehicle when the ignition switch is switched off.

In addition, the method may include configuring the controller 22 to deactivate the electromagnet 18/68 in response to unlocking the doors of the motor vehicle. Further, the method may include configuring the controller 22 to deactivate the electromagnet 18/68 in response to the battery or power source 52 of the motor vehicle falling below a predetermined voltage level as indicated at the third data input 48 by the battery charge status monitoring device 50. In addition, the method may include the step of selecting the frangible component 14 from a group of components consisting of a mirror body 64, a tail lamp, a fog lamp, a logo, a hood ornament and a trim panel.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An anti-theft lock system for a motor vehicle, comprising:
   a motor vehicle support surface;
   a component to be protected from theft; and
   an electromagnetic locking feature securing said component to said motor vehicle support surface, said electromagnetic locking feature including an electromagnet fixed to said motor vehicle support surface, a ferromagnetic target fixed to said component and a controller configured to activate said electromagnet in response to an ignition switch of said motor vehicle being switched off.

2. The anti-theft lock system of claim 1, wherein said controller is further configured to activate said electromagnet in response to locking of doors of said motor vehicle.

3. The anti-theft lock system of claim 2, wherein said component is frangible and will break if removed while said electromagnet is activated.

4. An anti-theft mirror, comprising:
   a mirror housing;
   a mirror body held in said mirror housing; and
   an electromagnetic locking feature securing said mirror body to said mirror housing, said electromagnetic locking feature including an electromagnet fixed to said mirror housing, a ferromagnetic target fixed to said mirror body and a controller configured to activate said electromagnet in response to an ignition switch being switched off.

5. The anti-theft mirror of claim 4, wherein said controller is further configured to activate said electromagnet in response to locking of doors.

6. The anti-theft mirror of claim 5, further including a mirror frame for supporting said mirror body.

7. The anti-theft mirror of claim 6, wherein said mirror frame includes an inner margin defining an aperture, said electromagnet extending into said aperture and in contact with said ferromagnetic target.

8. The anti-theft mirror of claim 7, wherein said ferromagnetic target is integrated into said mirror body.

9. A method of preventing theft of a frangible component from a motor vehicle, comprising:
   providing an electromagnetic locking feature to secure said frangible component to a motor vehicle support surface;
   securing said frangible component with sufficient electromagnetic force to cause said frangible component to break if removed from said motor vehicle support surface while said electromagnetic locking feature is activated;
   fixing an electromagnet to said motor vehicle support surface;
   fixing a ferromagnetic target to said frangible component; and
   configuring a controller of said electromagnetic locking feature to activate said electromagnet when an ignition switch of said motor vehicle is switched off.

10. The method of claim 9, including configuring said controller to activate said electromagnet in response to locking of doors of said motor vehicle when said ignition switch is switched off.

11. The method of claim 10, including configuring said controller to deactivate said electromagnet in response to unlocking of said doors of said motor vehicle.

12. The method of claim 10, including configuring said controller to deactivate said electromagnet in response to a power source of said motor vehicle falling below a predetermined voltage level.

13. The method of claim 10, including selecting said frangible component from a group of components consisting of a mirror body, a tail lamp, a fog lamp, a logo, a hood ornament and a trim panel.

* * * * *